Patented Aug. 3, 1926.

1,594,608

UNITED STATES PATENT OFFICE.

HARRY ESSEX AND ALGER L. WARD, OF WILMINGTON, DELAWARE, ASSIGNORS TO E. I. DU PONT DE NEMOURS & COMPANY, OF WILMINGTON, DELAWARE, A CORPORATION OF DELAWARE.

PROCESS OF MAKING DIHYDROXY CARBON COMPOUNDS.

No Drawing. Application filed November 22, 1919. Serial No. 340,073.

This invention relates to the production of dihydroxy compounds (alpha-glycols) from organic compounds containing at least one pair of carbon atoms united by a double bond. In general our invention comprises converting an unsaturated organic compound into a halohydrin in such a way that the resulting reaction mixture contains water and an alkali-forming metal carbonate such as sodium or calcium carbonate in addition to said halohydrin, and then heating said reaction mixture to bring about hydrolysis of the halohydrin.

In an investigation to find processes most suitable for the commercial synthesis of glycerol we discovered that allyl chloride could be converted, with good yields, into glycerol dichlorhydrins by slowly passing carbon dioxide into a mixture of allyl chloride and a water solution of an alkali, or alkaline earth, metal hypochlorite, and that the resulting reaction mixture was so constituted that conversion of the dichlorhydrins into glycerol could be readily effected simply by heating the mixture, preferably with the addition of a further quantity of carbonate. This process is described and claimed in our Patent No. 1,477,113, dated December 11, 1923.

We have now found that other carbon compounds containing an ethylenic linkage may be converted in an analogous manner first into the corresponding halohydrins, and then by hydrolysis, and without isolation of the halohydrins, into the corresponding alpha-glycols. The compounds which may be caused to undergo the above described transformation vary widely in molecular structure and in chemical and physical properties, but they are all characterized by possessing a pair of doubly linked carbon atoms so situated with respect to the rest of the molecule as to be capable of combining additively with the OH and Cl radicals of hypochlorous acid to form chlorhydrins. Examples of such compounds are (1) olefines, such as ethylene, propylene, butylene, etc.; (2) aryl-substituted alkylenes, such as styrole (phenylethylene or vinylbenzene); and (3) substituted olefines with miscellaneous substituents, such as gamma-hydroxypropylene (allyl alcohol).

Our new process may be illustrated by the following examples:—

I. Ethylene glycol.

To prepare ethylene glycol according to this method 482 cu. ft. of ethylene and 241 cu. ft. of carbon dioxide, measured at standard conditions, are passed into a cold 5% hypochlorite solution containing 100 lbs. of sodium hypochlorite. The ethylene should preferably be admitted to the solution in the form of very fine bubbles, which may be accomplished by forcing the ethylene through the pores of unglazed earthenware. The solution should be kept cold throughout the operation and the carbon dioxide admitted sufficiently slowly to keep low the concentration of free hypochlorous acid. The resulting solution of ethylene chlorhydrin is then heated to boiling under a reflux condenser and kept at this temperature for several hours. If a test shows that chlorates are absent, the ethylene glycol formed may be recovered by concentration and distillation. The reactions involved are:

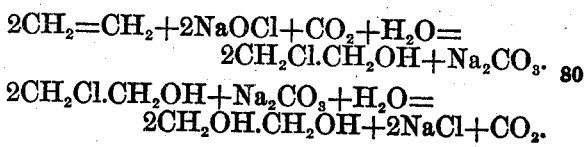

II. Phenyl glycol.

104 lbs. of styrole are added to 74.5 lbs. of sodium hypochlorite in water solution, the mixture vigorously stirred and carbon dioxide passed in, while keeping the mixture cool, until substantially all the hypochlorite has been decomposed. The chlorhydrin is then hydrolyzed to phenyl glycol by boiling the product under a reflux condenser. The reations involved are:

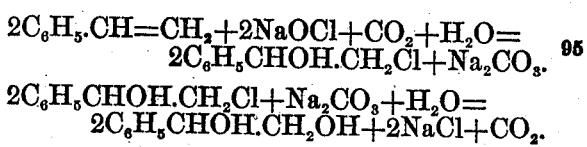

III. Glycerine from allyl alcohol.

58 lbs. of allyl alcohol are added to 74.5 lbs. of sodium hypochlorite in water solution, the mixture vigorously stirred and carbon dioxide passed into the cooled solution until hypochlorites have disappeared. The glycerine monochlorhydrin produced is hydrolyzed to glycerine by boiling the product under a reflux condenser. The principal reactions involved are:

$$2CH_2OH.CH = CH_2 + 2NaOCl + CO_2 + H_2O = 2CH_2OH.CHCl.CH_2OH + Na_2CO_3.$$

$$2CH_2OH.CHCl.CH_2OH + Na_2CO_3 + H_2O = 2CH_2OH.CHOH.CH_2OH + 2NaCl + CO_2.$$

As evidence of the wide applicability of this process there may be mentioned the production, in a manner similar to that described in the preceding examples, of phenylglyceric acid $$(C_6H_5.CHOH.CHOH.COOH)$$

from cinnamic acid $$(C_6H_5.CH:CH.COOH),$$

of dihydroxystearic acid from oleic acid, and of trihydroxystearic acid from ricinoleic acid.

Various changes may be made in the process set forth in detail above without departing from our invention. Thus in place of the alkali-forming metal hypochlorite referred to above, there may be used other hypohalites such as sodium, calcium, or barium hypobromite; the resulting halohydrins are then hydrolyzed to dihydroxy compounds by heating the reaction mixture as described in the specific examples.

We claim:—

1. The process of producing a dihydroxy carbon compound which comprises causing a carbon compound containing a pair of doubly linked carbon atoms to combine with hypohalous acid in the presence of an alkali-forming metal carbonate to form a halohydrin, and heating the reaction mixture containing an alkali-forming metal carbonate to hydrolyze the halohydrin.

2. The process of producing phenylglycol which comprises passing carbon dioxide into a mixture of styrole and a water solution of sodium hypochlorite, while keeping the mixture cool, until substantially all the hypochlorite has been decomposed, and then boiling the resulting mixture until the chlorhydrin contained therein is hydrolyzed to phenyl glycol.

In testimony whereof we affix our signatures.

HARRY ESSEX.
ALGER L. WARD.